(12) United States Patent
Oyanagi (10) Patent No.: US 8,506,070 B2
(45) Date of Patent: Aug. 13, 2013

(54) RECORDING METHOD, RECORDED MATTER, INK JET RECORDING APPARATUS, AND IDENTIFICATION METHOD

(75) Inventor: Takashi Oyanagi, Matsumoto (JP)

(73) Assignee: Seiko Epson Corporation (JP)

( * ) Notice: Subject to any disclaimer, the term of this patent is extended or adjusted under 35 U.S.C. 154(b) by 777 days.

(21) Appl. No.: 12/508,663

(22) Filed: Jul. 24, 2009

(65) Prior Publication Data

US 2010/0026751 A1 Feb. 4, 2010

(30) Foreign Application Priority Data

Jul. 29, 2008 (JP) ................................. 2008-194490

(51) Int. Cl.
*B41J 2/01* (2006.01)

(52) U.S. Cl.
USPC ........................................................ 347/102

(58) Field of Classification Search
USPC ................................ 347/100–102; 106/31.46
See application file for complete search history.

(56) References Cited

U.S. PATENT DOCUMENTS

| | | | | |
|---|---|---|---|---|
| 5,549,740 | A * | 8/1996 | Takahashi et al. | 106/31.43 |
| 6,893,536 | B2 * | 5/2005 | Ilmonen et al. | 162/135 |
| 2006/0165997 | A1 * | 7/2006 | Tevis et al. | 428/411.1 |
| 2008/0074484 | A1 * | 3/2008 | Sugahara | 347/102 |
| 2008/0145628 | A1 * | 6/2008 | Oyanagi et al. | 428/206 |
| 2008/0250970 | A1 | 10/2008 | Oyanagi et al. | |
| 2009/0289973 | A1 * | 11/2009 | Makuta et al. | 347/9 |
| 2009/0303304 | A1 * | 12/2009 | Oyanagi et al. | 347/100 |

FOREIGN PATENT DOCUMENTS

| | | |
|---|---|---|
| CN | 1159040 | 9/1997 |
| CN | 1653141 | 8/2005 |
| CN | 1787920 | 6/2006 |
| JP | 08-197838 | 8/1996 |
| JP | 2001-287454 | 10/2001 |
| JP | 2002-179960 | 6/2002 |
| JP | 2002-225415 A | 8/2002 |
| JP | 2003-026970 A | 1/2003 |
| JP | 2003-026971 A | 1/2003 |
| JP | 2003-72050 | 3/2003 |
| JP | 2003-72051 | 3/2003 |
| JP | 2008-174712 | 7/2008 |
| WO | 03-074619 | 9/2003 |
| WO | 2004-080723 | 9/2004 |
| WO | WO-2008-101054 A1 | 8/2008 |

OTHER PUBLICATIONS

English Patent Abstract of Japan 2001-287454 Published Oct. 16, 2001.
English Patent Abstract of Japan 2002-179960 Published Jun. 26, 2002.

(Continued)

*Primary Examiner* — Julian Huffman
*Assistant Examiner* — Sharon A Polk
(74) *Attorney, Agent, or Firm* — Harness, Dickey & Pierce, P.L.C.

(57) ABSTRACT

A recording method, includes: discharging droplets of an ink composition, and adhering the droplets to a recording medium to form a first dot group using an ink jet recording apparatus; and adhering a lustrous ink composition containing a color material containing plate-like particles at least onto the first dot group to form a second dot group.

16 Claims, 2 Drawing Sheets

(56) References Cited

OTHER PUBLICATIONS

English Patent Abstract of Japan 2003-72050 Published Mar. 12, 2003.

English Patent Abstract of Japan 2003-72051 Published Mar. 12, 2003.

English Patent Abstract of Japan 2008-174712 Published Jul. 31, 2008.

* cited by examiner

RECORDING METHOD, RECORDED MATTER, INK JET RECORDING APPARATUS, AND IDENTIFICATION METHOD

BACKGROUND

1. Technical Field

The present invention relates to a recording method, recorded matter, an ink jet recording apparatus, and an identification method.

2. Related Art

In recent years, a demand for printed matters having a metallic luster surface formed on a printing surface has increased. The printed matters having a metallic luster surface or a pearl luster surface have a feature in that the reproduction thereof is difficult, in addition to the appearance characteristics due to the luster. For example, it is extremely difficult to copy or reproduce the printed matters having a metallic luster surface using a commercially-available copying machine, printer, or the like because it is difficult to capture image information on the metallic luster surface or the pearl luster surface by optical scanning and a toner or ink capable of reproducing metallic luster or pearl luster is not provided therein.

The metallic luster surface includes a high mirror-like luster surface and a matte luster surface having a matte tone. The glossiness of the metallic luster surfaces is defined by specular glossiness (JIS Z8741 or the like). Even when a former business-use printer and former printing ink, it is difficult to reproduce printing having a high metallic luster in which the 20° specular glossiness exceeds 100%. For such printing, apart from a printer, a foil stamping device using a metallic foil, such as hot stamping or cold stamping, is used. This is a method for pressing a metallic foil against a recording medium having a printing surface with high flatness for printing. Examples of a method for printing having a high metallic luster include a method for vacuum depositing metal to a plastic film having a smooth printing surface and a method for performing printing using metallic pigment ink to a recording medium, and further performing press processing.

For a metallic luster surface having a high metallic luster, a method employing an ink jet recording method has also been proposed. For example, JP-A-2002-179960 discloses a printing technique including applying an ink composition containing, as a pigment, plastic spherical particles whose surface has been coated with metal to a recording medium by an ink jet recording apparatus, and then smoothing the surface by press processing.

Examples of a former method for forming a matte luster surface include a gravure printing method, a screen printing method, and a flexographic printing method using metallic pigment ink. Moreover, a method including forming a pattern on a recording medium beforehand by pressing or the like, and then performing foil stamping printing or thermal transfer printing using a metallic foil is mentioned.

However, the former printing techniques mentioned above have been suitable for forming one metallic luster surface or pearl luster surface having a specific glossiness on a printing surface. Therefore, according to the printing techniques, it has been difficult to form a plurality of metallic luster surfaces or pearl luster surfaces different in glossiness on one target printed matter by a single printing process.

In order to form a plurality of metallic luster surfaces and pearl luster printing surfaces different in glossiness, a former gravure printing method or a former flexographic printing method has been required to change the types of metallic pigment ink and pearl pigment ink for each printing and a former foil stamping method or a former thermal transfer printing method has been required to prepare substances exclusive for use in each printing process, such as a mold for forming irregularities or a printing plate, a roll, etc., to be exchanged. Therefore, in the former methods, printing processes and printing apparatuses tend to be extremely complicated, e.g., a plurality of printing apparatuses are combined in series to sequentially form metallic luster surfaces and pearl luster surfaces or specific printing, roll, etc., are added to the printing apparatuses.

The present inventors have focused attention on the facts that the glossiness of a metallic luster surface changes depending on the arithmetic average roughness (Ra) of the metallic luster surface and the arithmetic average roughness (Ra) can be easily controlled by controlling the used amount of a radiation curable ink composition by an ink jet recording method using the radiation curable ink composition, and thus the invention has been accomplished.

SUMMARY

An advantage of the invention is to provide a recording method capable of imparting arbitrary glossiness to a metallic luster surface by a simple process when a metallic luster surface is formed on a recording medium.

An advantage of the invention is to provide printed matter that is difficult to copy or reproduce.

An advantage of the invention is to provide a method for easily identifying recorded matter.

A recording method according to a first aspect of the invention includes: discharging droplets of an ink composition, and adhering the droplets to a recording medium to form a first dot group using an ink jet recording apparatus; and adhering a lustrous ink composition containing a color material containing plate-like particles at least onto the first dot group to form a second dot group.

According to such a method, a metallic luster surface having an arbitrary glossiness can be easily formed on a recording medium.

According to a second aspect of the invention, in the recording method, the color material containing plate-like particle is at least one of metallic pigments and pearl pigments.

According to a third aspect of the invention, in the recording method, the material of the metallic pigment can be aluminum or an aluminum alloy.

According to a fourth aspect of the invention, in the recording method, the metallic pigment or the pearl pigment can contain plate-like particles formed of a multilayer thin film.

According to a fifth aspect of the invention, in the recording method, the process of forming the first dot group can be performed using a radiation curable ink composition.

According to a sixth aspect of the invention, the recording method can further include, a process of irradiating the first dot group with radiation rays for curing after the process of forming the first dot group.

According to a seventh aspect of the invention, in the recording method, the process of irradiating the first dot group with radiation rays for curing can be performed by emitting light having a wavelength of 350 nm to 450 nm.

According to an eighth aspect of the invention, in the recording method, the process of forming the second dot group can be performed by discharging droplets of the lustrous ink composition, and adhering the droplets at least onto the first dot group using the ink jet recording apparatus.

According to a ninth aspect of the invention, the recording method can further include: a process of adhering a radiation curable clear ink composition to form a third dot group after the process of forming the second dot group; and a process of irradiating the third dot group with radiation rays for curing.

According to a tenth aspect of the invention, in the recording method, the process of irradiating the third dot group with radiation rays for curing can be performed by emitting light having a wavelength of 350 nm to 450 nm.

According to an eleventh aspect of the invention, in the recording method, conditions such that when the major axis on a plane of the color material containing plate-like particles is defined X, the minor axis thereof is defined as Y, and the thickness thereof is defined as Z, the 50% average particle diameter R50 in terms of equivalent-circle diameter determined from the area of the XY plane of the plate-like particles is 0.5 to 3 μm and R50/Z>5 is established can be satisfied.

According to a twelfth aspect of the invention, in the recording method, the first dot group is formed in such a manner as to have a pattern on the surface; and the pattern has an arithmetic average roughness (Ra) of a roughness curve defined in Japanese Industrial Standard JIS B0601:2001 of 0.4 to 1.4 μm.

According to a thirteenth aspect of the invention, in the recording method, the pattern can be controlled by the adhesion amount of the droplets of the ink composition in the process of forming the first dot group.

Recorded matter according to a fourteenth aspect the invention contains: information that is recorded by the recording method.

Such recorded matter is difficult to reproduce.

An ink jet recording apparatus according to a fifteenth aspect of the invention is used for the recording method.

An identification method according to a sixteenth aspect of the invention, in which the identification method is an identification method for the recorded matter; the identification method includes a process of observing, under a microscope, a particle shape of the color material containing plate-like particles contained in the lustrous ink composition forming the second dot group; and the identification method judges the authenticity of the recorded matter by propriety of the particle shape of the color material containing plate-like particle observed under the microscope.

According to such a method, the authenticity of the recorded matter can be easily identified.

An identification method according to a seventeenth aspect of the invention, in which the identification method is an identification method for the recorded matter; an identifying substance is contained in the second dot group; a process of observing the second dot group under a microscope is included; and the authenticity of the recorded matter is judged by the content of the identifying substance observed under the microscope.

According to an eighteenth aspect of the invention, in the identification method, the identifying substance can be at least one selected from transparent particles, colored particles, and fluorescent materials.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferable embodiments of the invention will be described in detail.

1. RECORDING METHOD

A recording method according to an aspect of the invention includes a process of forming a first dot group on a recording medium and a process of forming a second dot group at least on the first dot group.

In this specification, the "dot group" refers to an adhered substance of an ink composition to be formed on a printing surface of printed matters, such as characters, images, dots (solid), etc.

1.1. First Dot Group Forming Process

The process of forming the first dot group is performed by discharging droplets of an ink composition, and adhering the droplets onto a recording medium using an ink jet recording apparatus. The first dot group can be formed in such a manner as to have a pattern (e.g., irregularities) on the surface.

1.1.1. Ink Jet Recording Apparatus

The Ink jet recording apparatus used in the process is not limited insofar as recording can be performed by discharging ink droplets, and adhering the droplets onto a recording medium.

Examples of a recording method of the ink jet recording apparatus include: a method including applying a strong electric field between a nozzle and an accelerating electrode placed in front of the nozzle, successively spraying ink in the form of droplets from the nozzle, and providing a printed information signal to deflection electrodes while the ink droplets being flying between the deflection electrodes for recoding or a method including spraying the ink droplets without being deflected in accordance with the printed information signal (electrostatic suction method); a method including applying a pressure to ink liquid with a small pump, and mechanically vibrating a nozzle by a quartz resonator or the like, thereby forcibly spraying ink droplets; a method including simultaneously applying a pressure and a printed information signal to ink liquid by a piezoelectric element for spraying the ink droplets and recording (piezo method); and a method including heat foaming ink liquid in accordance with a printed information signal with a microelectrode for spraying ink droplets and recording (thermal jet method).

Examples of the ink jet recording apparatus used in this process include an apparatus equipped with an ink jet recording head, a body, a tray, a head driving mechanism, a carriage, and an ultraviolet ray emitting device provided on the side surface of the carriage. The ink jet recording head is equipped with inks of four colors of cyan, magenta, yellow, and black and ink jet recording ink cartridges, and can be structured so that full color printing can be performed. Moreover, it is also possible to use neutral color ink, deep color ink, light color ink, white ink, or transparent ink and ink jet recording ink cartridges. In this process, a radiation curable ink composition is charged in at least one of the ink jet recording ink cartridges. The ink jet recording apparatus has a control board for exclusive use and the like thereinside, and the discharging amount and discharging timing of inks in the ink jet recording head and the scanning of the head driving mechanism can be controlled.

The ink jet recording apparatus has a plurality of ink jet recording cartridges, and an ink composition suitable for this process described later can be contained in at least one of them. To the ink jet recording cartridges other than the above, usual inks can be stored.

When such an ink jet recording apparatus is used, the first dot group can be easily formed by adhering an ink composition to a recording medium by spraying.

An ultraviolet ray emitting device for emitting ultraviolet rays can be provided to the inside of the ink jet recording apparatus, a paper ejecting port, and the side surface of the carriage in the device. The emitting of ultraviolet rays can be performed by leading light of a metal halide lamp, a xenon lamp, a carbon arc lamp, a chemical lamp, a low pressure mercury lamp, a high pressure mercury lamp, or the like by a light guide or the like to the dot group. As a light source, commercially available light sources available from Fusion System and the like, such as an H lamp, a D lamp, or a V lamp, can be used. As the light source, an ultraviolet ray emitting semiconductor element, such as an ultraviolet ray emitting diode (ultraviolet ray LED) or an ultraviolet ray emitting semiconductor laser, can be used. Ultraviolet rays from the light source can be emitted to the recording medium or droplets adhered thereto in the ink jet recording apparatus.

1.1.2. Recording Medium

A recording medium used in this process is not limited insofar as droplets of an ink composition can be adhered by an ink jet recording apparatus. When substances having a smooth printing surface, such as: a surface-treated paper, such as a coated paper, an art paper, or a cast coated paper, an olefin synthetic paper, a luster or matte-finished vinyl chloride sheet or tarpaulin, a plastic film, such as an olefin film, such a PE film or a PP film, a polycarbonate film, an acrylic resin film, or a PET film, a plate or a foamed plate of an acrylic resin, a PVC resin, an ABS resin, or an urethane resin, is selected for the recording medium, the formation of a metallic luster surface having a high glossiness is facilitated, and the range of changes in the glossiness of the metallic luster surface to be formed on a recording medium can be extended.

As examples of the coated paper, a paper in which 7 g/m$^2$ to 20 g/m$^2$ of a white coating material is applied at least to one side of a fine paper or a wood containing paper as a base can be mentioned. The paper may be referred to as a high-quality coated paper or a medium-quality coated paper. As the type of the coated paper, a light-weight coated paper having a small coated amount (e.g., about 7 g/m$^2$ per one side) of a white coating material, a matte coated paper having a reduced glossiness, and a mirror coated paper having a high surface glossiness can be mentioned.

As the art paper, a paper in which a white coating material is applied to a fine paper in an amount of about 20 g/m$^2$ per one side, a high pressure is applied by a roll or the like, and the surface is smoothened can be mentioned. The art paper includes a matte art paper, a high quality art paper, a medium quality art paper, etc. As the cast-coated paper, a paper in which a white coating material is applied to a fine paper in an amount of at least 22 g/m$^2$ per one side, a high pressure is applied by a roll or the like, and the surface is smoothened can be mentioned.

The recording medium described above is not limited in the surface flatness, any of a gross type, a matte type, and a dull type may be used. Examples of a commercially-available recording medium include a pearl coated paper (available from Mitsubishi Paper Mills, Ltd.), an aurora coated paper (available from Nippon Paper Industries Co., Ltd.), and a gloss vinyl chloride sheet (e.g., trade name SV-G-610G, SPVC-G-1270T: manufactured by Roland D G corporation), and a PET film (e.g., trade name XEROX FILM with no frame: manufactured by Fuji Xerox).

1.1.3. Ink Composition

The first dot group formed in this process contains an ink composition adhered to the recording medium by the ink jet recording apparatus. The ink composition used in this process has a feature such that at least one ingredient thereof remains on the recording medium.

Examples of such an ink composition remaining the recording medium include a radiation curable ink composition, a common pigment ink composition, and a hot melt type ink composition. The hot melt type ink composition contains a wax ingredient and the viscosity can be adjusted by melting the same by heating to a viscosity at which the ink composition can be discharged by the ink jet recording apparatus. The hot melt type ink composition is an ink composition that is cooled when adhered onto the recording medium, and solidified due to a reduced temperature.

All of the radiation curable ink composition, the common pigment ink composition, and the hot melt type ink composition allow remaining of at least one ingredient on the recording medium, and formation of a pattern (e.g., irregularities) on the surface of the remaining ink composition. For example, the common pigment ink composition contains at least a pigment as an ingredient that is not absorbed in the recording medium. When the pigment remains on the recording medium, a pattern can be formed on the surface. For example, in the case of the hot melt type ink composition, at least one portion thereof can be made to remain on the recording medium by adjusting the permeability in the recording medium, the viscosity of the composition, a temperature when adhered, and thus a pattern can be formed on the surface. Hereinafter, a radiation curable ink composition particularly preferable in this process will be described.

1.1.4. Radiation Curable Ink Composition

The first dot group formed in this process can be constituted by radiation curable ink composition adhered to the ink jet recording medium by the recording apparatus. The radiation curable ink composition usable in this process contains at least a polymerizable compound and a radiation-polymerization initiator.

1.1.4.1. Polymerizable Compound

As polymerizable compounds contained in the radiation curable ink composition usable in this process, monofunctional polymerizable compounds and polyfunctional polymerizable compounds can be mentioned. As the polymerizable compounds, any compound is used without limitation insofar as the compound causes a polymerization reaction by the application of a certain energy, and is cured. Any type can be used without limitation, such as a monomer type, an oligomer type, a straight-chain polymer type, and a dendritic polymer type. More specifically, as the polymerizable compound, a radical polymerizable compound can be mentioned.

Examples of the radical polymerizable compound usable in the radiation curable ink composition include (meth)acrylates, (meth)acrylamides, aromatic vinyls, allyl compounds, N-vinyl compounds, vinyl esters (e.g., vinyl acetate, vinyl propionate, and versatic acid vinyl), allyl esters (e.g., allyl acetate), halogen containing monomers (e.g., vinylidene chloride and vinyl chloride), vinyl ethers (methyl vinyl ether, butyl vinyl ether, hexylvinyl ether, methoxyvinyl ether, 2-ethylhexyl vinyl ether, methoxyethyl vinyl ether, cyclohexylvinyl ether, and chloroethyl vinyl ether), vinyl cyanides (e.g., (meth)acrylonitrile), and olefins (e.g., ethylene and propylene). In this specification, when both or either of "acrylate" and/or "methacrylate" are/is referred to, "(meth)acrylate" is sometimes used and when both or either of "acryl" and/or "methacryl" are/is referred to, "(meth)acryl" is sometimes used.

Examples of monofunctional (meth)acrylates include hexyl(meth)acrylate, 2-ethylhexyl(meth)acrylate, tert-octyl (meth)acrylate, isoamyl(meth)acrylate, decyl(meth)acrylate, isodecyl(meth)acrylate, stearyl(meth)acrylate, isostearyl (meth)acrylate, cyclohexyl(meth)acrylate, 4-n-butyl-cyclohexyl(meth)acrylateacrylate, bornyl(meth)acrylate, isobonyl (meth)acrylate, benzyl(meth)acrylate, 2-ethylhexyl diglycol (meth)acrylate, butoxyethyl(meth)acrylate, 2-chloroethyl (meth)acrylate, 4-bromobutyl(meth)acrylate, cyanoethyl (meth)acrylate, benzyl(meth)acrylate, butoxymethyl(meth) acrylate, 3-methoxybutyl(meth)acrylate, alkoxymethyl (meth)acrylate, alkoxyethyl(meth)acrylate, 2-(2-methoxyethoxy)ethyl(meth)acrylate, 2-(2-butoxyethoxy) ethyl(meth)acrylate, 2,2,2-tetrafluoroethyl(meth)acrylate, 1H,1H,2H,2H-perfluorodecyl(meth)acrylate, 4-butylphenyl (meth)acrylate, phenyl(meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth) acrylate, tetrahydrofurfuryl(meth)acrylate, hydroxyalkyl (meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, dimethylaminoethyl(meth)acrylate, diethylaminoethyl (meth)acrylate, dimethylaminopropyl(meth)acrylate, diethylaminopropyl(meth)acrylate, trimethoxysilylpropyl(meth) acrylate, trimethoxysilylpropyl(meth)acrylate, trimethylsilyl propyl(meth)acrylate, polyethylene eoxide monomethyl ether(meth)acrylate, oligoethylene oxide monomethyl ether (meth)acrylate, polyethylene oxide(meth)acrylate, oligoethylene oxide(meth)acrylate, oligoethylene oxide monoalkyl ether(meth)acrylate, polyethylene oxide monoalkyl ether (meth)acrylate, dipropylene glycol(meth)acrylate, polypropylene oxide monoalkyl ether(meth)acrylate, oligo propylene oxide monoalkyl ether(meth)acrylate, 2-methacryloyloxy ethylsuccinic acid, 2-methacryloyloxy hexahydrophthalic acid, 2-methacryloyloxy ethyl-2-hydroxypropyl phthalate, butoxydiethylene glycol(meth)acrylate, trifloroethyl(meth)acrylate, perphloro octylethyl(meth)acrylate, 2-hydroxy-3-phenoxypropyl(meth)acrylate, EO-modified phenol(meth)acrylate, EO-modified cresol(meth)acrylate, EO-modified nonyl phenol(meth)acrylate, PO-modified nonyl phenol(meth)acrylate, and EO-modified-2-ethylhexyl (meth)acrylate.

Examples of polyfunctional(meth)acrylates include bifunctional(meth)acrylates, such as 1,6-hexanediol di(meth) acrylate, 1,10-decanediol di(meth)acrylate, neopentyl glycol di(meth)acrylate, tripropylene glycol di(meth)acrylate, 2,4-dimethyl-1,5-pentanediol di(meth)acrylate, butylethyl propanediol di(meth)acrylate, ethoxylated cyclohexane methanol di(meth)acrylate, polyethylene glycol di(meth)acrylate, oligo ethylene glycol di(meth)acrylate, ethylene glycol di(meth)acrylate, 2-ethyl-2-butyl-butanediol di(meth)acrylate, neopentyl hydroxypivalate glycol di(meth)acrylate, EO-modified bisphenol A di(meth)acrylate, bisphenol F polyethoxy di(meth)acrylate, polypropylene glycol di(meth) acrylate, oligo propylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth)acrylate.

Furthermore, examples of polyfunctional (meth)acrylates include trifunctional (meth)acrylates, such as trimethylolpropane tri(meth)acrylate, trimethylolethane tri(meth)acrylate, alkyleneoxide-modified trimethylolpropane tri(meth)acrylate, pentaerythritol tri(meth)acrylate, dipentaerythritol tri (meth)acrylate, trimethylolpropane tri((meth)acryloyloxypropyl)ether, isocyanuric acid alkyleneoxide-modified tri (meth)acrylate, dipentaerythritol propionate tri(meth) acrylate, tri((meth)acryloyloxyethyl)isocyanurate, hydroxypivalaldehyde-modified dimethylolpropane tri (meth)acrylate, sorbitol tri(meth)acrylate, propoxylated trimethylolpropane tri(meth)acrylate, and ethoxylated glycerin tri(meth)acrylate; tetrafunctional(meth)acrylates, such as pentaerythritol tetra(meth)acrylate, sorbitol tetra(meth)acrylate, ditrimethyrollpropane tetra(meth)acrylate, dipentaerythritol propionate tetra(meth)acrylate, and ethoxylated pentaerythritol tetra(meth)acrylate; pentafunctional(meth) acrylates, such as sorbitol penta(meth)acrylate and dipentaerythritol penta(meth)acrylate; and hexafunctional(meth) acrylates, such as dipentaerythritol hexa(meth)acrylate, sorbitol hexa(meth)acrylate, phosphazene alkyleneoxide-modified hexa(meth)acrylate, and captolactone-modified dipentaerythritol hexa(meth)acrylate.

As polyfunctional (meth)acrylates, compounds having a plurality of (meth)acryloyl groups in the molecules are mentioned. For example, compounds in which a plurality of (meth)acryloyl groups are bonded to straight chain polymers or compounds in which a plurality of (meth)acryloyl groups are bonded to dendritic polymers can be mentioned. In particular, specific examples of the compounds in which a plurality of (meth)acryloyl groups are bonded to dendritic polymers include a compound under the trade name of Viscoat #1000 available from Osaka Organic Chemical Industry, Co. LTD. The compound is a hyperbranched polymer that is synthesized by branching a functional group from dipentaerythritol as the core and has a high density of the acryloyl groups near the surface of the polymer molecules. Therefore, the compound can be preferably used as the polymerizable compound.

Examples of (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth) acrylamide, N-isopropyl(meth)acrylamide, N-methylol (meth)acrylamide, N,N-dimethyl(meth)acrylamide, N,N-diethyl(meth)acrylamide, and (meth)acryloyl morpholine.

Specific examples of aromatic vinyls include styrene, methylstyrene, trimethylstyrene, ethylstyrene, isorpropylstyrene, chloromethylstyrene, methoxystyrene, acetoxystyrene, chlorostyrene, dichlorostyrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene.

Allyl compounds have a 2-propenyl structure (—CH$_2$CH=CH$_2$) structure. A 2-propenyl group is also referred to as an allyl group and is a trivial name in the IUPAC nomenclature. Specific examples of the allyl compound include ethylene glycol monoallyl ether, allyl glycol (available from, for example, Nippon Nyukazai Co., Ltd.), trimethylolpropane diallyl ether, pentaerythritol triallyl ether, glycerin monoallyl ether (available from, for example, Daiso Co., Ltd.), and allyl group-containing polyoxyalkylene compounds having trade names of UNIOX, UNILUBE, POLYCERIN and UNISAFE (available from NOF Corp.).

N-vinyl compounds have a structure in which a vinyl group is bonded to nitrogen (>N—CH=CH$_2$). The N-vinyl compounds have a radical polymerization property. Specific examples of the N-vinyl compounds include N-vinylformamide, N-vinylcarbazole, N-vinylindole, N-vinylpyrrole, N-vinylacetamide, N-vinylpyrrolidone, N-vinylcaprolactam, and derivatives thereof. Among the above compounds, N-vinylformamide is particularly preferable. N-vinylformamide is available from, for example, Arakawa Kagaku Kogyo Co., Ltd.

The radiation curable ink composition can contain a plurality of the polymerizable compounds mentioned above.

The content of the polymerizable compound in the radiation curable ink composition is suitably 50 mass % to 95 mass %, preferably 60 mass % to 92 mass %, and more preferably 70 mass % to 90 mass %, based on the whole composition.

1.1.4.2. Radiation Polymerization Initiator

The radiation curable ink composition usable in this process contains a radiation polymerization initiator. The radiation polymerization initiator for use in the radiation curable ink composition can generate a radical with radiation rays. Examples of radiation rays capable of generating the radical of the radiation polymerization initiator include ultraviolet rays in the range of 400 nm to 200 nm, visible light, far ultraviolet ray, g ray, h ray, i ray, KrF excimer laser light, ArF excimer laser light, electron beam, X ray, molecular beam, or ion beam.

As the radiation polymerization initiator contained in the radiation curable ink composition include aromatic ketones, aromatic onium salt compounds, organic peroxides, hexaaryl biimidazole compounds, ketoxime ester compounds, borate compounds, adinium compounds, metallocene compounds, active ester compounds, compounds having a carbon halogen bond, etc., can be mentioned. As specific examples of an ultraviolet polymerization initiator capable of generating a radical by ultraviolet rays among radiation polymerization initiators, benzyl dimethyl ketal, α-hydroxyalkyl phenone, α-amino alkyl phenone, acyl phosphine oxide, oxime ester, thioxanthone, α-dicarbonyl, anthraquinone, etc., can be mentioned.

Specific examples of the radiation polymerization initiator include compounds available under the trade names of Vicure 10 and 30 (manufactured by StaufferChemical), Irgacure 127, 184, 500, 651, 2959, 907, 369, 379, 754, 1700, 1800, 1870, and 819, OXE01, Darocur 1173, TPO, and ITX (manufactured by Ciba Specialty Chemicals), QuantacureCTX (manufactured by Aceto Chemical), Kayacure and DETX-S (manufactured by Nippon Kayaku Co., Ltd.), and ESACURE KIP150 (manufactured by Lamberti).

The above-mentioned radiation-polymerization initiators generate a radical by receiving radiation rays. The generated radical can function as a polymerization initiator of polymerizable compounds.

1.1.4.3. Other Ingredients

The radiation curable ink composition usable in this process may contain a color material, a polymerization accelerator, a thermal radical polymerization inhibitor, a surfactant, a wetting agent, a penetration solvent, a pH adjustor, an antiseptic agent, an antifungal agent, etc., in addition to the above-mentioned polymerizable compounds and radiation-polymerization initiators. In addition, the radiation curable ink composition usable in this process can further contain a leveling additive, a matte agent, a polyester resin, a polyurethane resin, a vinyl resin, an acrylic resin, a rubber resin for adjusting the physical properties of recorded matters, and waxes as required.

As a color material that can be used for the radiation curable ink composition, dyes or pigments may be used.

As dyes, various dyes for use in common ink jet recording, such as direct dyes, acid dyes, food colors, basic dyes, reactive dyes, disperse dyes, vat dyes, or soluble vat dyes, can be mentioned.

The pigment is not limited, and inorganic pigments and organic pigments can be mentioned. As inorganic pigments, in addition to titanium oxide and iron oxide, carbon black produced by known methods, such as a contacting method, a furnace method, or a thermal method, can be used. As organic pigments, azo pigments (including azo lake, insoluble azo pigments, condensed azo pigments, chelate azo pigments, etc.), polycyclic pigments (e.g., phthalocyanine pigments, perylene pigments, perynone pigments, anthraquinone pigments, and quinophthalone pigments), dye chelates (e.g., basic dye type chelates and acidic dye type chelates), nitro pigments, nitroso pigments, aniline black, etc. can be used.

Among pigments, examples of carbon black include C. I. pigment black 7. Examples include No. 2300, No. 900, MCF 88, No. 33, No. 40, No. 45, No. 52, MA7, MA8, MA100, No. 2200B, etc., available from Mitsubishi Chemical, Inc., Raven 5750, 5250, 5000, 3500, 1255, and 700, etc., available from Columbia Chemical, Regal 400R, 330R, and 660R, MogulL 700, Monarch 800, 880, 900, 1000, 1100, 1300, and 1400, etc., available from Cabot Corp., and Color Black FW1, FW2, FW2V, FW18, and FW200, Color Black S150, S160, and S170, Printex 35, U, V, and 140U, Special Black 6, 5, 4A, and 4, etc., available from Degussa.

Examples of yellow pigments usable in the radiation curable ink composition include C. I. pigment yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Examples of magenta pigments usable in the radiation curable ink composition include C. I. pigment red 5, 7, 12, 48 (Ca), 48 (Mn), 57 (Ca), 57:1, 112, 122, 123, 168, 184, 202, and 209, and C.I. pigment violet 19.

Examples of cyan pigments usable in the radiation curable ink composition include C.I. pigment blue 1, 2, 3, 15:3, 15:4, 60, 16 and 22.

The average particle diameter of the pigment usable in the radiation curable ink composition is preferably in the range of 10 nm to 200 nm and more preferably in the range of 50 nm to 150 nm.

The addition amount of pigments usable in the radiation curable ink composition is preferably 0.1 mass % to 25 mass % and more preferably 0.5 mass % to 15 mass %.

When the radiation curable ink composition contains the pigment, a dispersant or a surfactant can be blended for favorable dispersion of the pigment. As a preferable dispersant, a dispersant commonly used for preparing a pigment dispersion liquid, and, for example, a polymer dispersant, can be used. As specific examples of the polymer dispersant, polyoxyalkylene polyalkylene polyamine can be mentioned. As specific example of polyoxyalkylene polyalkylene polyamine, Discole N-503, N-506, N-509, N-512, N-515, N-518, and N-520 (manufactured by Dai-Ichi Kogyo Seiyaku Co., Ltd.) can be mentioned.

When a color material is blended in the radiation curable ink composition, the first dot group can function as a general dot group for recording an image in addition to the function of forming a pattern (e.g., irregularities) on the surface.

The radiation curable ink composition can further contain a polymerization accelerator. There is no limitation on the polymerization accelerator usable in the radiation curable ink composition, and Darocur EHA and EDB (available from Ciba Specialty Chemicals), etc., are mentioned.

The radiation curable ink composition can also contain a thermal radical polymerization inhibitor. Since a thermal radical polymerization inhibitor is contained, the storage stability of the radiation curable ink composition can be increased. Examples of the thermal radical polymerization inhibitor include Irgastab UV-10 (available from Ciba Specialty Chemicals).

The radiation curable ink composition can further contain a surfactant so as to increase storage stability or the like. As a surfactant, for example, polyester-modified silicone or polyether-modified silicone can be used as a silicone surfactant, and polyether-modified polydimethylsiloxane or polyester-modified polydimethylsiloxane is particularly preferably used. As specific examples, BYK-347, BYK-348, BYK-UV3500, -UV3510, -UV3530, and -UV3570 (available from BYK-Chemie Japan K.K.) can be mentioned.

As described above, the process of forming the first dot group is performed by discharging droplets of an ink composition, and adhering the droplets to the recording medium using the ink jet recording apparatus. The first dot group to be formed is formed in such a manner as to have a pattern (e.g., irregularities) on the surface.

1.2. Second Dot Group Forming Process

A process of forming a second dot group is performed by adhering a lustrous ink composition containing a color material containing plate-like particles at least onto the first dot group.

1.2.1. Lustrous Ink Composition Adhering Method

Examples of a method for adhering a lustrous ink composition include an ink jet recording method, a printing method, such as mimeograph printing, such as screen printing, lithography printing, such as offset printing, relief printing, such as flexographic printing, or plate printing, such as gravure printing, and a coating method using a brush or a Japanese brush. Among the above methods, an ink jet recording method is particularly preferable in that a lustrous ink composition is easily adhered in such a manner as not to change the surface pattern formed on the surface of the first dot group. When this process is performed by an ink jet recording method, this process can be performed by charging a lustrous ink composition in place of the ink composition for forming the first dot group in the ink jet recording apparatus described in the section of "1.1.1. Ink jet recording apparatus" above.

The lustrous ink composition is adhered at least onto the first dot group, and may be adhered to the entire or a part of the first dot group on the first dot group. Moreover, the lustrous ink composition may be adhered to a part where the first dot group is not formed on the recording medium.

1.2.2. Lustrous Ink Composition

The second dot group formed in this process contains a lustrous ink composition containing a color material containing plate-like particles. The lustrous ink composition used in this process can form a metallic luster surface when adhered to a target. The lustrous ink composition contains a color material containing plate-like particles, an organic solvent, and resin.

1.2.2.1. Color Material Containing Plate-Like Particles

As a color material contained in the lustrous ink composition, any color material is used insofar as the material has a plate-like particle shape. The "plate-like particles" refer to particles having a substantially planar surface (XY plane) and having a substantially uniform thickness (Z).

It is preferable for the color material containing plate-like particles to satisfy condition such that when the major axis on a plane of the plate-like particles is defined X, the minor axis thereof is defined as Y, and the thickness thereof is defined as Z, the 50% average particle diameter R50 in terms of equivalent-circle diameter determined from the area of the XY plane of the plate-like particles id 0.5 to 3 μm and R50/Z>5 is established.

The "equivalent-circle diameter" refers to a diameter of a circle whose area is the same as the area when the XY plane of plate-like particles is projected in the Z direction. The equivalent-circle diameter can be measured by, for example, image analysis of observation results of a particle image analyzer (e.g., FPIA-2100, FPIA-3000, or FPIA3000S manufactured by SYSMEX CORPORATION) or observation results under a microscope.

The 50% average particle diameter R50 of the equivalent-circle diameter of plate-like particles refers to the equivalent-circle diameter in which the total number of particles measured when the equivalent-circle diameter of a sufficient number of the plate-like particles in a system is measured and a number (frequency) distribution of the particles to the equivalent-circle diameter is drawn is 50%.

The 50% average particle diameter R50 of the equivalent-circle diameter determined from the area of the XY plane of plate-like particles is preferably 0.5 to 3 μm and more preferably 0.75 to 2 μm from the viewpoint of metallic luster and printing stability.

The maximum particle diameter Rmax of the equivalent-circle diameter determined from the area of the XY plane of plate-like particles is preferably 10 μm or lower when printing is performed using a lustrous ink composition by the ink jet recording apparatus so that clogging of a nozzle is prevented.

The color material containing such plate-like particles is more preferably a metallic pigment and a pearl pigment because a favorable metallic luster surface can be formed. Hereinafter, the metallic pigment and the pearl pigment having a plate-like particle shape will be described.

When a metallic pigment and a pearl pigment are selected as the color material having a plate-like particle shape, a commercially available item can be used. In addition, in the case of metallic particles, it can be produced by a method of crushing a metal vapor-deposited film.

Examples of a pearl pigment include a common pearl coating material and clay mineral having a layer structure to be blended in ink, such as mica, talc, kaolin, bentonite, smectite, sepiolite, vermiculite, montmorillonite, and sericite. Furthermore, a plate-like pigment can be preferably used in which pearl luster has been further increased by coating, with titanium dioxide or iron oxide, a material that has been formed into a plate, such as mica that has been processed to have a thickness of 0.01 µm to 1 µm and have a particle diameter of 2 µm to 20 µm to form a thin multilayer structure.

As a method for creating plate-like particles of metal, the following method is mentioned, for example. First, a resin layer for separation is provided on a sheet-shaped base, and laminating a layer of metal or a metal alloy by a method, such as deposition, ion plating, or sputtering, thereon. At this time, by adjusting the thickness of the layer of metal or a metal alloy to 20 to 100 nm, metallic luster can be increased. Next, the layer of the resin for separation is separated from the layer of metal or a metal alloy at the interface therebetween to obtain the layer of metal or a metal alloy. Then, the layer of metal or a metal alloy is mechanically pulverized. Plate-like particles having a target particle diameter are obtained from the pulverized substance by sieving. Such metallic pigment allows lamination of a plurality of metal alloy layers and allows lamination of another layer in addition to the metal alloy layer. When the metallic pigment is formed with a thin multilayer, the resultant can be used as a metallic pigment whose metallic luster has been further improved.

The metal plate-like particles preferably contain aluminum or an aluminum alloy. When an aluminum alloy is selected, other elements to be contained in aluminum are not limited insofar as metallic luster can be developed as an aluminum alloy. As an aluminum alloy element, at least one selected from silver, gold, platinum, nickel, chromium, tin, zinc, indium, titanium, and copper can be mentioned.

All the above-mentioned metallic pigment and pearl pigment are plate-like particles, and satisfy condition such that when the major axis on a plane of the plate-like particles is defined X, the minor axis thereof is defined as Y, and the thickness thereof is defined as Z, the 50% average particle diameter R50 in terms of equivalent-circle diameter determined from the area of the XY plane of the plate-like particles is 0.5 to 3 µm and R50/Z>5 is established. Therefore, favorable metallic luster can be developed by the second dot group.

Since such plate-like particles have a shape in which the Z directions of the plate-like particles are easily in alignment with the normal direction of an adhesion surface when the second dot group is adhered thereto, the uniformity of thickness of the second dot group can be increased. Therefore, the surface pattern of a base (e.g., first dot group) is easily reflected to the top surface of the second dot group. Thus, a pattern formed by the first dot group can be reproduced on the surface of the second dot group. Therefore, an arbitrary metallic luster surface corresponding to changes in the surface pattern of the first dot group can be formed on the surface of the second dot group.

1.2.2.2. Organic Solvent

The lustrous ink composition contains an organic solvent. Preferable examples of the organic solvent include polar organic solvents, such as alcohols (e.g., methyl alcohol, ethyl alcohol, propyl alcohol, butyl alcohol, isopropyl alcohol, and fluorides thereof), ketones (e.g., acetone, methyl ethyl ketone, and cyclohexanone), carboxylates (e.g., methyl acetate, ethyl acetate, propyl acetate, butyl acetate, methyl propionate, and ethyl propionate), ethers (diethyl ether, dipropyl ether, tetrahydrofuran, and dioxane), and lactones (γ-butyrolactone, δ-valerolactone, and ε-caprolactone).

The organic solvent is preferably a liquid at normal temperature and at normal pressure and colorlessness and has less odor. As such a preferable organic solvent, alkylene glycol ether can be mentioned and the organic solvent of this embodiment preferably contains alkylene glycol ether. Furthermore, it is preferable for the organic solvent to have an ether group and a hydroxyl group in the molecules and have properties of both alcohols and ethers. As such an organic solvent, alkylene glycol monoether can be mentioned. It is more preferable for the organic solvent of this embodiment to contain alkylene glycol monoether.

Examples of alkylene glycol ether include ethers, such as aliphatic ethers, such as methyl ether, n-propyl ether, i-propyl ether, n-butyl ether, i-butyl ether, hexyl ether, or 2-ethylhexyl ether of alkylene glycol, allyl ether having a double bond, and phenyl ether.

Examples of an alkylene glycol part of alkylene glycol include ethylene glycol, diethylene glycol, triethylene glycol, tetraethylene glycol, propylene glycol, dipropylene glycol, tripropylene glycol, and tetrapropylene glycol.

Hereinafter, specific examples of alkylene glycol suitable as an organic solvent will be mentioned. Specific examples of alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, a dipropylene glycol monomethyl ether, and dipropylene glycol monoethyl ether.

Specific examples of alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Furthermore, alkylene glycol ether derivatives, such as propylene glycol monomethyl ether acetate, are also usable.

1.2.2.3. Resin

Examples of resin to be contained in the lustrous ink composition used in this process include an acrylic resin, a styrene-acrylic resin, a rosin-modified resin, a terpene resin, a polyester resin, a polyamide resin, an epoxy resin, a vinyl chloride resin, a polyvinyl chloride-acetate vinyl copolymer, a cellulose resin (e.g., cellulose acetate butylate and hydroxypropylcellulose), polyvinyl butyral, polyvinyl alcohol, and polyurethane.

As resin, non aqueous emulsion polymer fine particles (NAD=Non Aqueous Dispersion) can also be blended in the lustrous ink composition of this process. The non aqueous emulsion polymer fine particles refer to a dispersion liquid in which fine particles of a polyurethane resin, an acrylic resin, an acrylic polyol resin, etc., are stably dispersed in an organic solvent. For example, Sanprene IB-501 and IB-F370 manufactured by Sanyo Chemical Industries, Ltd., are mentioned as a polyurethane resin and N-2043-60MEX manufactured by HARIMA CHEMICALS, Inc., is mentioned as an acrylic polyol resin.

1.2.2.4. Other Ingredients

The lustrous ink composition used in this process may contain, in addition to at least one of the metallic pigments and pearl pigments, the organic solvent, and the resin mentioned above, an identifying substance, a color material, a surfactant, a wetting agent, a penetration solvent, an antiseptic agent, an antifungal agent, etc. The substances, such as a color material, a surfactant, a wetting agent, a penetration solvent, an antiseptic agent, and an antifungal agent, are the same as the substances that can be added to the radiation curable ink composition described in the section "1.1.4.3. Other ingredients" above.

Examples of the identifying substance include at least one selected from transparent particles, colored particles, and fluorescent materials. When such an identifying substance is blended in the lustrous ink composition, the identifying substance is intermixed with the second dot group. Therefore, the authenticity of the obtained recorded matter can be easily judged (Details will be described later.).

1.3. First Dot Group Curing Process

In the recording method of the invention, when the first dot group is formed with the radiation curable ink composition, a process of curing the first dot group can be added after the process of forming the first dot group.

When the first dot group is formed with the radiation curable ink composition, the first dot group is cured by emitting radiation rays in this process. Radiation rays capable of generating a radical of the radiation polymerization initiator for use in the radiation curable ink composition are emitted. The radiation rays are the same as those described in the section "1.1.4.2. Radiation polymerization initiator" and the generation method is also the same. Among the above, as the radiation rays, light having a wavelength of 350 to 450 nm is preferable in terms of simplification or safety of a device. In that case, it is preferable to select a radiation polymerization initiator that easily generates a radical by light having a wavelength of 350 450 nm.

The radiation rays can be emitted by guiding the radiation rays to the first dot group by a light guide or the like provided inside or to a paper ejecting port of the ink jet recording apparatus or from the outside of the ink jet recording apparatus. As described above, by providing an ultraviolet ray emitting device to a carriage side surface or the like in an ink jet recording apparatus, ultraviolet rays also can be emitted while making the ink jet recording apparatus follow the scanning of the carriage for forming the first dot group.

The curing treatment of the first dot group can be performed at any timing after the formation of the first dot group and before the formation of the second dot group. When an ultraviolet ray emitting device is provided to a carriage side surface or the like in the ink jet recording apparatus, and emitting ultraviolet rays while following the scanning of the carriage for forming the first dot group, the curing treatment can be performed immediately after the formation of the first dot group. The curing treatment can also be performed by irradiating the printing surface with ultraviolet rays after the completion of the formation of a given first dot group on the printing surface of the recording medium. The pattern shape to be formed on the surface of the first dot group can also be controlled by adjusting the fluidity of the radiation curable ink composition and the timing of performing the curing treatment.

1.4. First Dot Group Surface Shape

The surface of the first dot group can have a pattern (e.g., irregularities). The surface pattern of the first dot group can be measured by a surface shape measuring apparatus or a surface roughness meter, for example. The surface pattern of the first dot group can be characterized by the arithmetic average roughness (Ra) of the profile curve defined in Japanese Industrial Standard (JIS) B0601:2001, for example. By the process of forming the first dot group and the process of curing the first dot group, a pattern having an Ra value in the range of 0.4 to 1.4 µm can be given to the surface of the first dot group.

The range of the Ra value of the surface of the first dot group is based on the following experimental results by the present inventors. As the recording medium, a white vinyl chloride sheet (SPVC-G-1270T, manufactured by Roland D G Corporation) was prepared. A radiation curable ink composition was printed on the sheet using an ink jet recording apparatus (PX-7500, manufactured by Seiko Epson Corporation). A solid pattern was employed as a printing pattern. As the radiation curable ink, a radiation curable ink was used which has a composition of 71.6 mass % of ethylene glycol monoallyl ether and 20.0 mass % of Viscoat #1000 as a polymerizable compound, 6.4 mass % of Irgacure 819 and 1.6 mass % of Irgacure 127 as a photopolymerization initiator, and 0.2 mass % of BYK-UV 3500 and 0.2 mass % of Irgastab UV-10 as an additive. After the solid pattern was printed, the solid pattern was irradiated with ultraviolet rays by an ultraviolet ray emitting light source so that the integration light amount at the wavelength of 365 nm was 400 mJ/cm$^2$.

Figure 1:
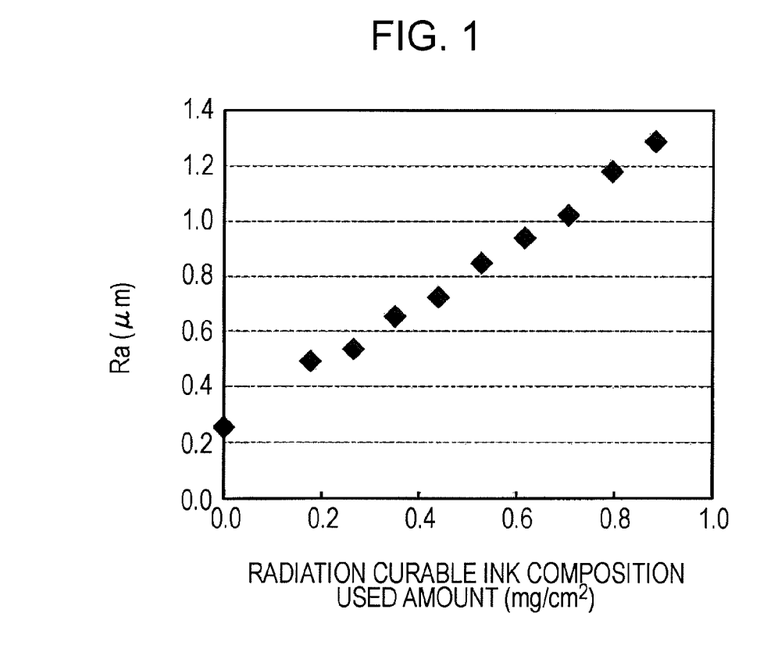
FIG. 1 is a graph plotting the arithmetic average roughness (Ra) of a profile curve of the surface of a first dot group relative to the used amount of a radiation curable ink composition.

At this time, a plurality of solid patterns different in the used amount of the radiation curable ink composition (mg/cm$^2$) were formed. Then, the surface of each of the obtained solid patterns (equivalent to the first dot group) was measured by a surface shape measuring apparatus (Laser microscope VK-9700, manufactured by Keyence Corp.), and the profile curve was obtained. The arithmetic average roughness Ra of the profile curve of each solid pattern was obtained using the apparatus. FIG. 1 is a graph plotting the arithmetic average roughness Ra(%) relative to the used amount of the ink (mg/cm$^2$).

As illustrated in FIG. 1, the arithmetic average roughness Ra of the surface of the first dot group can be successively changed depending on the used amount of the radiation curable ink composition to be adhered to the recording medium in the process of forming the first dot group. Furthermore, it has been found that there is a substantially linear correlation between the Ra of the surface of the first dot group and the used amount of the radiation curable ink composition to be adhered to the recording medium in the process of forming the first dot group.

1.5. Pattern Formation Method

When the radiation curable ink composition is used in the process of forming the first dot group and the process of curing the first dot group is performed, a pattern, such as a irregularities, is formed on the surface of the first dot group. Thus, the process can be utilized as a pattern formation method. More specifically, the pattern formation method includes a process of discharging droplets of the radiation curable ink composition, and adhering the droplets to the recording medium to form the first dot group using the ink jet recording apparatus and a process of curing the first dot group.

Such a pattern formation method can easily give a pattern having an Ra value in the range of 0.4 to 1.4 µm to the surface of the first dot group to be formed on the recording medium. Then, in such a pattern formation method, the Ra value can be controlled by the adhesion amount of the radiation curable ink composition to be adhered onto the recording medium.

1.6. Third Dot Group

The recording method of the invention can further include a process of adhering a radiation curable clear ink composition onto the second dot group to form a third dot group and a process of curing the third dot group.

The third dot group is formed with the radiation curable clear ink composition. The "clear ink" refers to ink capable of developing a function of protecting at least one of the recording medium, the first dot group, and the second dot group from mechanical friction when adhered, a function of giving "luster (gloss)" to the surface of recorded matter, or a function of giving color having a transparent feeling to the recorded matter. It is preferable that the radiation curable clear ink composition have the same composition as the above-described lustrous ink composition as the composition, be an ink composition in which the amount of resin ingredients except pigments has been increased or the above-described radiation curable ink composition, and be a composition not containing a pigment as a color material.

The radiation curable clear ink composition used in the process of forming the third dot group at least contains a polymerizable compound and a radiation polymerization initiator. Since the polymerizable compound and the radiation polymerization initiator used for the radiation curable clear ink composition are the same as those described in the sections "1.1.4.1. Polymerizable compound" and "1.1.4.2. Radiation polymerization initiator", the description thereof is omitted.

The radiation curable clear ink composition used in the process of forming the third dot group may contain a color material, a polymerization accelerator, a thermal radical polymerization inhibitor, a surfactant, a wetting agent, a penetration solvent, a pH adjustor, an antiseptic agent, an antifungal agent, etc., in addition to the above-mentioned polymerizable compound and radiation polymerization initiator. Furthermore, a leveling additive, a matte agent, a polyester resin, a polyurethane resin, a vinyl resin, an acrylic resin, a rubber resin for adjusting physical properties of recorded matter, and waxes can be blended as required.

When a color material is used for the radiation curable clear ink composition, a dye is preferable for securing permeability of light. As the dye, various dyes used for common ink jet recording, such as direct dyes, acid dyes, food dyes, basic dyes, reactive dyes, disperse dyes, vat dyes, soluble vat dyes, etc., can be mentioned. By blending the dye, the third dot group can be colored and a color can be given to the gloss of a metallic luster surface.

Since the method for adhering the radiation curable clear ink composition is the same as the method described in the section "1.2.1. Lustrous ink composition adhering method, the description thereof is omitted.

The third dot group is formed for protecting, polishing, or coloring the surface of the recorded matter to be formed. Therefore, the radiation curable clear ink composition is adhered onto at least one of the recording medium, the first dot group, and the second dot group.

Since the process of curing the third dot group is the same as "1.3. First dot group curing process", the description thereof is omitted.

1.7. Effects

According to the above-described recording method, the surface pattern (e.g., irregularities) of a metallic luster surface can be controlled by controlling the surface pattern (e.g., irregularities) of the first dot group. Since the surface pattern of the first dot group can be successively changed by the adhesion amount of the ink composition, the pattern of the metallic luster surface can be successively changed. Therefore, according to the recording method of the invention, variation in the specular glossiness of the metallic luster surface can be extremely easily achieved by adjusting the used amount of the ink composition used when the first dot group is formed. Thus, according to the recording method of the invention, a plurality of metallic luster surfaces different in the specular glossiness can be easily formed on one recording surface.

Furthermore, according to the recording method of the invention, it is easy to form the first dot group and the second dot group in an existing document for additional writing, and it is easy to form the document into a difficult-to-copy document. The recording method of the invention can easily form metallic luster surfaces different in the specular glossiness in the metallic luster surface and can provide a difficult-to-copy and reproduce recorded matter and can also protect the recording information itself, and makes it difficult to copy and reproduce the recorded information.

2. RECORDED MATTER

The recorded matter according to the invention is formed by the above-described recording method. Therefore, information can be recorded on the recording surface of the recording medium by a plurality of metallic luster surfaces different in the specular glossiness. Therefore, such recorded matter has a characteristic such that the recorded matter is extremely difficult to copy and reproduce using an optical detection member, such as copying. Furthermore, such recorded matter has a characteristic such that the recorded information can be visually read.

3. IDENTIFICATION METHOD

3.1. First Embodiment

The identification method according to this embodiment is an identification method for the above-described recorded matter. The identification method according to this embodiment is an identification method for the above-described recorded matter. The identification method includes a process of observing under a microscope the particle shape of a color material containing plate-like particles contained in the lustrous ink composition for forming the second dot group, and judges the authenticity of recorded matter by the propriety of the particle shape of the color material containing plate-like particles observed under a microscope.

The above-described recorded matter has the second dot group formed with the lustrous ink composition. Therefore, the color material containing plate-like particles having a characteristic shape is contained in the second dot group. As described above, the color material containing plate-like particles of the lustrous ink composition is formed of plate-like particles and satisfies conditions such that when the major axis on a plane of the plate-like particles is defined X, the minor axis thereof is defined as Y, and the thickness thereof is defined as Z, the 50% average particle diameter R50 in terms of equivalent-circle diameter determined from the area of the XY plane of the plate-like particles is 0.5 to 3 μm and R50/Z>5 is established. Therefore, the shape of the color material containing plate-like particles can be easily confirmed by observing the second dot group under a microscope. Examples of the microscope include various kinds of microscopes, a stereoscopic microscope, a fluorescence microscope, a laser scanning microscope, an optical microscope, such as a confocal laser scanning microscope, an electron microscope, such as a scanning electron microscope (SEM) or a transmission electron microscope (TEM), and a scanning probe microscope, such as SPM or AFM.

Thus, it can be judged whether the recorded matter is recorded by the above-described recording method, and thus the recorded matter can be identified and the authenticity of the recorded matter can be judged.

3.2. Second Embodiment

An identification method according to this embodiment is an identification method for the above-described recorded matter, in which an identifying substance is contained in the second dot group, a process of observing the second dot group under a microscope is included, and the authenticity of the recorded matter is judged by the content of the identifying substance observed under a microscope.

The recorded matter of this embodiment employs a lustrous ink composition containing the identifying substance in the process of forming the second dot group. Therefore, the second dot group is formed while the identifying substance being contained. By observing the second dot group under a microscope, the content of the identifying substance can be easily confirmed. Examples of the microscope include various kinds of optical microscopes, a scanning electron microscope, and a transmission electron microscope.

It is preferable to use a substance having characteristics in terms of the shape and physical properties for the identifying substance. For example, a substance having sphericity as excellent as standard particles and having a particle size distribution close to that of single dispersion is only used for special applications, such as calibration of a measuring device, and thus does not adhere to printed matter in the general environment. Therefore, the authenticity can be easily judged by observation using an optical microscope. In the case of fluorescent particles, properties of absorbing light of a specific wavelength and emitting light having a wavelength shifted by the Stokes shift can be utilized, and the authenticity thereof can be easily judged.

In particular, when observed using the laser microscope, the pigment particles and the identifying substances can be easily observed. Examples of the standard particles include Standard size particles 8000 and 9000 series manufactured by Moritex Corporation and Tospearl 120 and 130 manufactured by Momentive Performance Technologies, Inc. Examples of the fluorescent particles include blue fluorescent particles and green fluorescent particles manufactured by Moritex Corporation.

Thus, it can be judged whether the recorded matter is recorded by the above-described recording method, and thus the recorded matter can be identified and the authenticity of recorded matter can be judged.

It is preferable to add the identifying substance in the range where the observation with naked eye is not influenced and the judgment can be easily performed by an observation device.

4. EXAMPLES

Hereinafter, the invention will be more specifically described with reference to Examples, but is not limited to the following Examples.

4.1. Production of Specular Glossiness and Surface Pattern Evaluating Sample

4.1.1. First Dot Group Formation

As a recording medium, a white vinyl chloride sheet (SPVC-G-1270T, manufactured by Roland D G Corporation) was prepared. A radiation curable ink composition was printed on the sheet using an ink jet recording apparatus (PX-7500, manufactured by Seiko Epson Corporation). A solid pattern having a width of 10 cm and a length of 2 m was employed as a printing pattern. As the radiation curable ink, a radiation curable ink was used which has a composition of 71.6 mass % of ethylene glycol monoallyl ether and 20.0 mass % of Viscoat #1000 as a polymerizable compound, 6.4 mass % of Irgacure 819 and 1.6 mass % of Irgacure 127 as a photopolymerization initiator, and 0.2 mass % of BYK-UV 3500 and 0.2 mass % of Irgastab UV-10 as an additive. After the solid pattern was printed, the solid pattern was irradiated with ultraviolet rays by an ultraviolet ray emitting light source so that the integration light amount at the wavelength of 365 nm was 400 mJ/cm$^2$. At this time, a plurality of solid patterns different in the used amount of the radiation curable ink composition (mg/cm$^2$) were formed. Thus, the first dot group having different surface patterns was formed on the recording medium.

4.1.2. Second Dot Group Formation

Next, a lustrous ink composition was printed onto the solid pattern (first dot group) using an ink jet recording apparatus (SP-300V, manufactured by Roland D G Corporation). As the used lustrous ink composition, a lustrous ink composition was produced and used which contains 63.8 mass % of diethylene glycol diethyl ether (manufactured by Nippon Nyukazai Co., Ltd.), 15 mass % of γ-butyrolactone (manufactured by Kanto Chemical Co., Ltd.), and 18 mass % of tetraethylene glycol dimethyl ether (manufactured by Nippon Nyukazai Co., Ltd.) as an organic solvent, 2 mass % of N-2043-60MEX (manufactured by HARIMA CHEMICALS, Inc.) as resin, 0.2 mass % of BYK-UV 3500 (manufactured by BYK-Chemie Japan K.K.) as a surfactant, and 1 mass % in terms of solid content of metal powder having R50 of 0.89 μm, an average film-thickness (Z) of 0.02 μm, and R50/Z44.5 as a metallic pigment. Thus, the second dot group was formed on the first dot group having different surface patterns.

The second dot group was formed so that the thickness of the second dot group was uniform throughout the region and the weight after dry was 11 μg/cm$^2$ by adjusting the discharge amount of the lustrous ink composition to 1.1 mg/cm$^2$.

The metal powder used in this Example was produced as follows. First, a resin layer coating liquid containing 3 mass % of cellulose acetate butylate (butylated degree of 35 to 39%, manufactured by Kanto Chemical Co., Ltd.) and 97 mass % of diethylene glycol diethyl ether (manufactured by Nippon Nyukazai Co., Ltd.) is uniformly applied onto a PET film having a film thicknesses of 100 μm by the bar coating method, and then the resultant was dried at 60° C. for 10 minutes to form a resin film layer on the PET film.

Next, an aluminum vapor-deposited layer having an average film thicknesses of 20 nm was formed on the resin layer using a vacuum depositing device (VE-1010, manufactured by Vacuum Device Co., Ltd.).

Next, the laminate was ultrasonic dispersed in diethylene glycol diethyl ether. The ultrasonic dispersion was performed using an ultrasonic disperser VS-150 manufactured by As One Corp. The processing time was 12 hours. At this time, the aluminum vapor-deposited layer was separated from the resin film layer and became finer. The obtained dispersion liquid was filtered using an SUS mesh filter having an opening of 5 μm to remove coarse particles. Subsequently, the resultant was purified by a solvent to obtain metal powder having the above-described properties.

4.2. Production of Copy and Visibility Evaluating Sample

4.2.1. First Dot Group Formation

As a recording medium, an A4 size transparent PET film (trade name: XEROX FILM with no frame: manufactured by Fuji Xerox) was prepared. A radiation curable ink composition was printed on the film using an ink jet recording apparatus (PX-7500, manufactured by Seiko Epson Corporation). A solid pattern having a width of 4 cm and a length of 4 cm was employed as a printing pattern. The used radiation curable ink was the same as described in the section "4.1. Production of specular glossiness and surface pattern evaluating sample" above. After the solid pattern was printed, the solid pattern was irradiated with ultraviolet rays by an ultraviolet ray emitting light source so that the integration light amount at the wavelength of 365 nm was 400 mJ/cm². At this time, a plurality of solid patterns different in the used amount of the radiation curable ink composition (mg/cm²) were formed. Specifically, the first dot group having nine different surface patterns was formed on the recording medium while changing the used amount by 10 (mg/cm²) in the range of 20 (mg/cm²) to 100 (mg/cm²). Thus, two pieces of printed matter 1000 and printed matter 2000 of Examples were produced under the same conditions.

4.2.2. Second Dot Group Formation

Next, a lustrous ink composition was printed onto nine solid patterns (first dot group) of each of the printed matter 1000 and the printed matter 2000 using an ink jet recording apparatus (SP-300V, manufactured by Roland D G Corporation). The second dot group was formed on the two printed matters in the same manner as in the section "4.1.2. Second dot group formation".

4.2.3. Third Dot Group Formation

Next, a third dot group was formed on the printed matter 2000 on which the second dot group was formed. The third dot group was formed on the nine solid patterns (first dot group) of the printed matter 2000 using the radiation curable ink composition and curing conditions similar to those described in the section "4.1. Production of specular glossiness and surface pattern evaluating sample".

4.3. Evaluation of Specular Glossiness and Surface Pattern

4.3.1. Evaluation of Specular Glossiness

Figure 2:
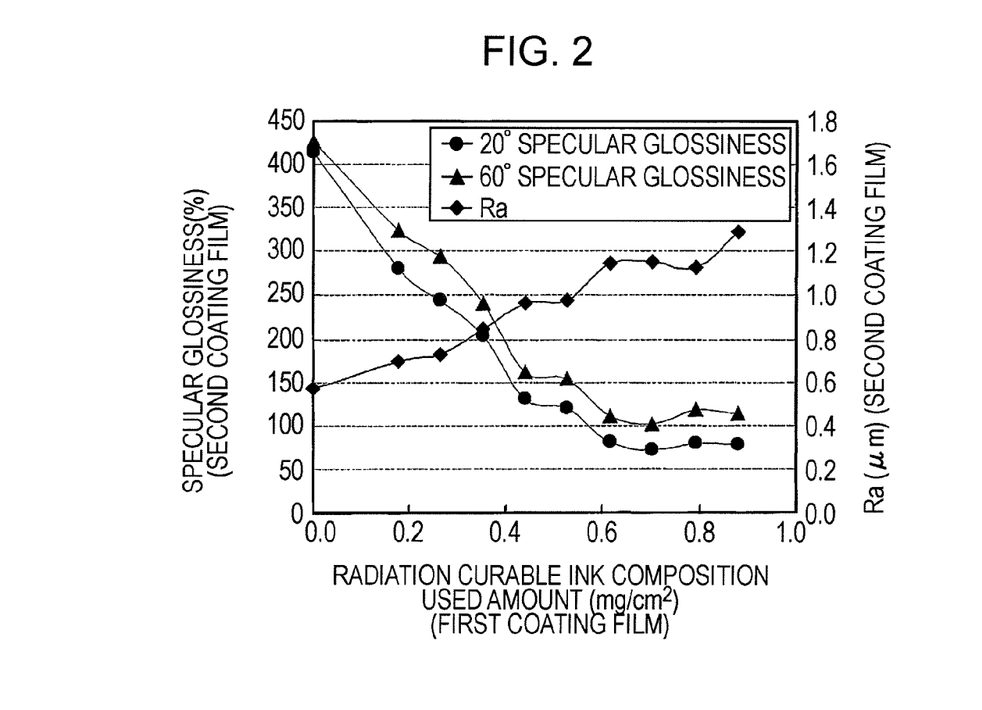
FIG. 2 is a graph plotting the surface arithmetic average roughness (Ra), 20° specular glossiness, and 60° specular glossiness of a profile curve of the second dot group relative to the used amount of the radiation curable ink composition.

The specular glossiness of the surface of the recorded matter (second dot group) was measured according to Japanese Industrial Standard (JIS) Z8741:1997. The used device is Gloss Meter Model VGP5000 manufactured by Nippon Denshoku Industries Co., Ltd. FIG. 2 plotted the results of 20° specular glossiness and 60° specular glossiness in the different surface pattern portions of the recorded matter.

4.3.2. Evaluation of Recorded Matter Surface Pattern

The surface pattern (surface shape of the second dot group) of the recorded matter was evaluated by a profile curve obtained by measuring the surface with a surface shape measuring device (laser scanning microscope VK-9700, manufactured by KEYENCE CORP.). The arithmetic average roughness Ra of the profile curve of each solid pattern was calculated using the device. FIG. 2 plotted the arithmetic average roughness Ra(%) relative to the used amount of the ink (mg/cm²).

4.3.3. Evaluation Results of Specular Glossiness and Surface Pattern

As seen in FIG. 2, the second dot group had a surface pattern reflecting the surface pattern of the first dot group. Thus, it has been found that the pattern of the metallic luster surface can be controlled by controlling the surface pattern of the first dot group. Furthermore, it has been found that since the Ra value of the surface pattern of the first dot group can be successively changed by the adhesion amount of the radiation curable ink composition, the Ra value of the metallic luster surface can also be successively changed.

As seen in FIG. 2, it has also been found that there is a correlation between the Ra value of the surface pattern of the first dot group and the specular glossiness value thereof and when the Ra value of the surface pattern of the second dot group increases, the specular glossiness values (both 20° and 60°) decrease. It has also been found that since the Ra value of the surface pattern of the second dot group can be successively changed, the specular glossiness value can also be successively changed arbitrarily.

The above results have clarified that the specular glossiness value of recorded matter can be changed in a wide range on the basis of the surface pattern of the first dot group. As is clear from Examples above, it has been clarified that variation of the specular glossiness of the metallic luster surface can be extremely easily achieved by the amount of the radiation curable ink composition used at the time of forming the first dot group by an ink jet recording apparatus. Therefore, according to such a method, it is proved that a plurality of metallic luster surfaces having a different specular glossiness can be easily formed on one recording surface.

4.4. Evaluation of Copying Properties and Visibility

Figure 3:
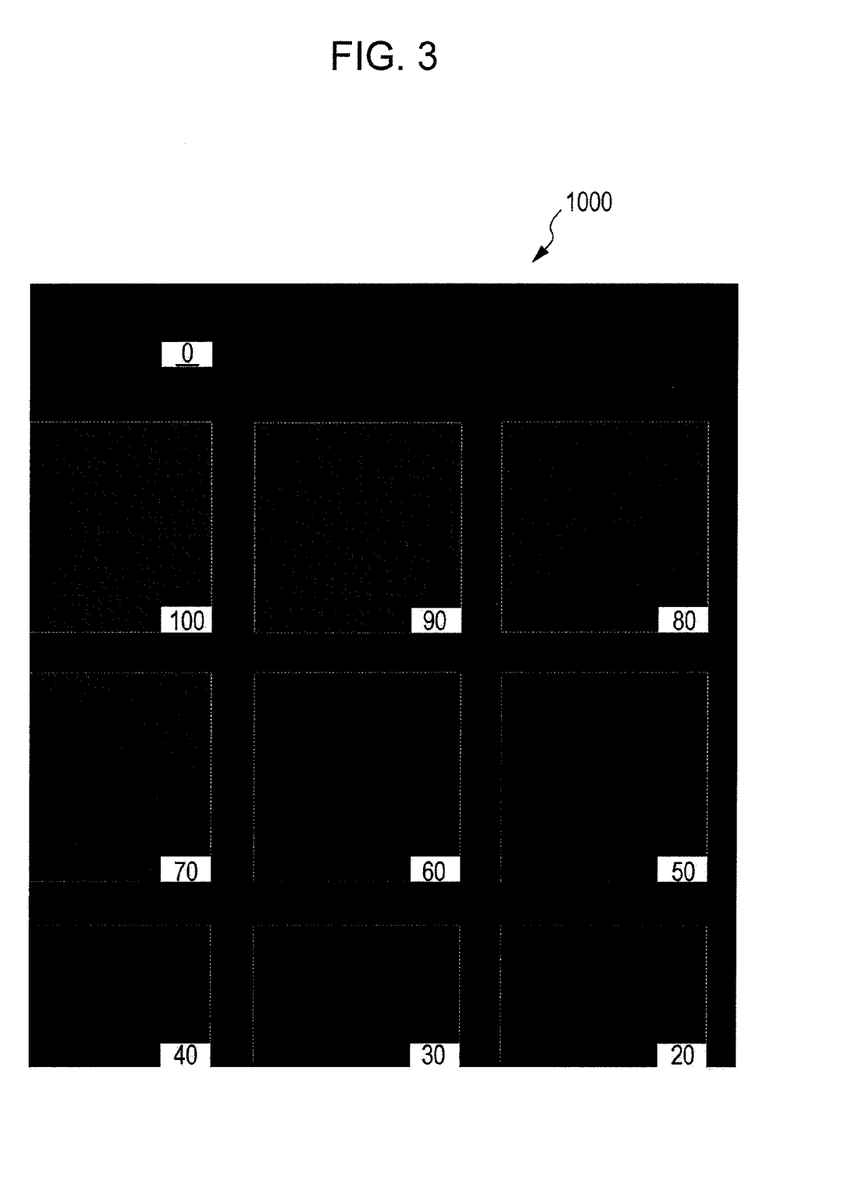
FIG. 3 shows copying results of metallic luster surfaces different in specular glossiness.

FIG. 3 illustrates results of copying the printed matter 1000 on which the third dot group was not formed among those produced in the section "4.2. Production of copy and visibility evaluating sample" above by a copying machine (Docucentre 650I, manufactured by Fuji Xerox). In FIG. 3, a part designated by a reference numeral 0 refers to a region in which the dot group is not formed and rectangle regions designated by reference numerals 20 to 100 refer to regions where the amount of the radiation curable ink composition used when the first dot group is formed by 10 (mg/cm²) in the range of 20 (mg/cm²) to 100 (mg/cm²) and the reference numerals and the used amount are in agreement with each other. When the regions where the second dot group is formed of the printed matter 1000 and the printed matter 2000 were observed with naked eye, all the regions had metallic luster.

This Example has clarified that metallic luster surfaces having arbitrary specular glossiness can be easily formed on the same and one recording surface of one recording medium.

FIG. 3 shows that metallic luster is not reproduced in any printing region by copying, which has clarified that the printed matter 1000 cannot be reproduced by a copying machine. Furthermore, it has been clarified that, in the regions (20 to 60) where the used amount of the radiation curable ink composition when the first dot group is formed is 60 (mg/cm²) or lower, copying results that cannot be distinguished from a region where printing is not performed are obtained although the second dot group is formed. More specifically, it has been found that, in these regions, the recording information formed with the metallic luster surface that can be easily read visually cannot be copied by a copying machine. The same results were obtained in the printed matter 2000 when same evaluation was performed.

Image capturing of the printed matter 1000 and the printed matter 2000 was attempted by a scanner (using a scanner function of PM-A970, manufactured by Seiko Epson Corporation). Then, it has been clarified that the metallic luster part in the captured data is recognized as color from black to gray and thus the metallic luster cannot be reproduced from the obtained image data similarly as in the case of a copying machine, although metallic luster of the metallic luster part can be easily recognized visually.

The above results show that even when the recorded matters (printed matter 1000 and printed matter 2000) of Examples have a metallic luster surface that can be sufficiently read by the naked eye, the recorded matters cannot be copied and reproduced because optical image reading is very difficult.

Moreover, it has been clarified that when information is recorded by the metallic luster surfaces different in the specular glossiness in the recorded matters of this Example, the information cannot be read by an optical method although the information can be read by the naked eye, i.e., information that is difficult to copy and reproduce can be achieved.

The invention is not limited to the above-described embodiments, and can be further variously modified. For example, the invention includes a structure substantially the same as the structure described in the embodiments (e.g., a structure in which functions, methods, and results are the same or a structure in which objects and effects are the same). Moreover, the invention includes a structure in which non-essential parts in the structure described in the embodiments have been replaced. The invention also includes a structure that exhibits the same effects as those in the structure described in the embodiments or a structure that can achieve the same objects as those in the structure described in the embodiments. The invention also includes a structure in which known techniques have been added to the structured described in the embodiments.

What is claimed is:

1. A recording method, comprising the steps of:
   (1) forming a first metallic luster surface having a first specular glossiness on a recording medium by
      (a) discharging droplets of an ink composition, and adhering the droplets to the recording medium to form a first dot group using an ink jet recording apparatus, wherein the droplets discharged to the recording medium comprise a first amount of the ink composition; and
      (b) adhering a lustrous ink composition containing a color material containing plate-like particles at least onto the first dot group to form a second dot group wherein the first dot group is formed in such a manner as to have a pattern on the surface; and the pattern has an arithmetic average roughness (Ra) of a roughness curve defined in Japanese Industrial Standard JIS B0601:2001 of 0.4 to 1.4 μm; and
   (2) forming a second metallic luster surface on the recording medium by repeating steps (a) and (b) with the proviso that a different amount of the ink composition is discharged onto the recording medium in step (a) so that the second metallic luster surface formed on the recording medium has a different specular glossiness than the first specular glossiness.

2. The recording method according to claim 1, wherein the color material containing plate-like particle is at least one of metallic pigments and pearl pigments.

3. The recording method according to claim 2, wherein, the material of the metallic pigment is aluminum or an aluminum alloy.

4. The recording method according to claim 2, wherein the metallic pigment or the pearl pigment contains plate-like particles formed of a multilayer thin film.

5. The recording method according to claim 1, further comprising;
   a process of adhering a radiation curable clear ink composition to form a third dot group after the process of forming the second dot group; and
   a process of irradiating the third dot group with radiation rays for curing.

6. The recording method according to claim 5, wherein the process of irradiating the third dot group with radiation rays for curing is performed by emitting light having a wavelength of 350 nm to 450 nm.

7. The recording method according to claim 1, wherein conditions such that when the major axis on a plane of the color material containing plate-like particles is defined X, the minor axis thereof is defined as Y, and the thickness thereof is defined as Z, the 50% average particle diameter R50 in terms of equivalent-circle diameter determined from the area of the XY plane of the plate-like particles is 0.5 to 3 m and R50/Z>5 is established are satisfied.

8. The recording method according to claim 1, wherein the pattern is controlled by the adhesion amount of the droplets of the ink composition in the process of forming the first dot group.

9. The recording method according to claim 1, wherein steps (a) and (b) result in formation of recorded matter and the method further comprises the steps of
   observing, under a microscope, a particle shape of the color material containing plate-like particle contained in the lustrous ink composition forming the second dot group; and
   judging the authenticity of the recorded matter by propriety of the particle shape of the color material containing plate-like particles observed under the microscope.

10. The recording method according to claim 1, wherein steps (a) and (b) result in formation of recorded matter and wherein
   an identifying substance is contained in the second dot group, the method further comprising the steps of observing the second dot group under a microscope, and judging the authenticity of the recorded matter by the content of the identifying substance observed under the microscope.

11. The identification method according to claim 10, wherein the identifying substance is at least one selected from the group consisting of transparent particles, colored particles, and fluorescent materials.

12. A recording method, comprising the steps of:
(a) discharging droplets of an ink composition, and adhering the droplets to a recording medium to form a first dot group using an ink jet recording apparatus; and
(b) adhering a lustrous ink composition containing a color material containing plate-like particles at least onto the first dot group to form a second dot group, wherein the first dot group is formed in such a manner as to have a pattern on the surface; and the pattern has an arithmetic average roughness (Ra) of a roughness curve defined in Japanese Industrial Standard JIS B0601:2001 of 0.4 to 1.4 μm; and wherein the process of forming the first dot group is performed using a radiation curable ink composition.

13. A recording method, comprising the steps of:
(a) discharging droplets of an ink composition, and adhering the droplets to a recording medium to form a first dot group using an ink jet recording apparatus; and
(b) adhering a lustrous ink composition containing a color material containing plate-like particles at least onto the first dot group to form a second dot group, wherein the first dot group is formed in such a manner as to have a pattern on the surface; and the pattern has an arithmetic average roughness (Ra) of a roughness curve defined in Japanese Industrial Standard JIS B0601:2001 of 0.4 to 1.4 μm; and
(c) a process of irradiating the first dot group with radiation rays for curing after the process of forming the first dot group.

14. The recording method according to claim 13, wherein the process of irradiating the first dot group with radiation rays for curing is performed by emitting light having a wavelength of 350 nm to 450 nm.

15. A recording method, comprising the steps of:
(a) discharging droplets of an ink composition, and adhering the droplets to a recording medium to form a first dot group using an ink jet recording apparatus; and
(b) adhering a lustrous ink composition containing a color material containing plate-like particles at least onto the first dot group to form a second dot group, wherein the first dot group is formed in such a manner as to have a pattern on the surface; and the pattern has an arithmetic average roughness (Ra) of a roughness curve defined in Japanese Industrial Standard JIS B0601:2001 of 0.4 to 1.4 μm; wherein the process of forming the second dot group is performed by discharging droplets of the lustrous ink composition, and adhering the droplets at least onto the first dot group using the ink jet recording apparatus.

16. An ink jet recording apparatus, comprising:
(a) means for discharging droplets of an ink composition and for adhering the droplets to a recording medium to form a first dot group having a pattern on a surface of the recording medium with an arithmetic average roughness (Ra) of a roughness curve defined in Japanese Industrial Standard JIS B0601:2001 of 0.4 to 1.4 μm;
(b) means for adhering a lustrous ink composition containing a color material containing plate-like particles at least onto the first dot group to form a second dot group; and
(c) means for controlling an amount of the ink composition discharged onto the recording medium in step (a) such that a plurality of first dot groups having different surface patterns can be formed on the surface of the recording medium and the surface of the recording medium can be formed with respective surface patterns having different specular glossiness.

* * * * *